(12) United States Patent
Beyette, Jr. et al.

(10) Patent No.: US 10,823,661 B2
(45) Date of Patent: Nov. 3, 2020

(54) ANALYTE SENSOR AND METHOD OF USE

(71) Applicant: University of Cincinnati, Cincinnati, OH (US)

(72) Inventors: Fred R. Beyette, Jr., Cincinnati, OH (US); Geethanga Gayan De Silva, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 77 days.

(21) Appl. No.: 15/932,299

(22) PCT Filed: Aug. 18, 2016

(86) PCT No.: PCT/US2016/047532
§ 371 (c)(1),
(2) Date: Feb. 16, 2018

(87) PCT Pub. No.: WO2017/031303
PCT Pub. Date: Feb. 23, 2017

(65) Prior Publication Data
US 2019/0086322 A1 Mar. 21, 2019

Related U.S. Application Data

(60) Provisional application No. 62/206,345, filed on Aug. 18, 2015, provisional application No. 62/207,954, filed on Aug. 21, 2015.

(51) Int. Cl.
*G01N 21/03* (2006.01)
*G01N 21/05* (2006.01)
*G01N 21/62* (2006.01)

(52) U.S. Cl.
CPC ......... *G01N 21/0303* (2013.01); *G01N 21/05* (2013.01); *G01N 21/62* (2013.01); *G01N 2021/052* (2013.01)

(58) Field of Classification Search
CPC combination set(s) only.
See application file for complete search history.

(56) References Cited

U.S. PATENT DOCUMENTS

| 5,465,860 A | 11/1995 | Fujimoto et al. |
| 6,558,626 B1 * | 5/2003 | Aker ............ G01N 21/05 |
| | | 422/82.08 |

(Continued)

FOREIGN PATENT DOCUMENTS

| WO | 1997038300 A1 | 10/1997 |
| WO | 2003064994 A1 | 8/2003 |

(Continued)

OTHER PUBLICATIONS

International Search Report and Written Opinion for corresponding PCT/US2016047532 dated Dec. 13, 2016.

(Continued)

*Primary Examiner* — Mohamed K Amara
(74) *Attorney, Agent, or Firm* — Dinsmore & Shohl LLP

(57) ABSTRACT

A sensor for isolating, identifying, and quantifying one or more analytes in a sample is provided. Also provided are methods of isolating, identifying, and quantifying one or more analytes in a sample, the method including contacting a polymer waveguide with a sample, sequentially heating the polymer waveguide to a plurality of temperature thresholds, obtaining an optical output at each temperature threshold, and analyzing differences in sequentially-obtained optical outputs in order to identify and determine concentrations of individual analytes of interest in the sample.

9 Claims, 8 Drawing Sheets

(56) References Cited

U.S. PATENT DOCUMENTS

| | | | |
|---|---|---|---|
| 6,936,167 B2* | 8/2005 | Hobbs | G01N 30/466 210/143 |
| 6,974,673 B2 | 12/2005 | Lockhart | |
| 7,253,413 B2* | 8/2007 | Sauer | G01N 21/3504 250/339.08 |
| 7,419,636 B2* | 9/2008 | Aker | G01N 21/05 422/50 |
| 7,450,227 B2* | 11/2008 | Dwight | B82Y 30/00 356/300 |
| 7,502,109 B2* | 3/2009 | Bonne | G01F 1/6845 356/328 |
| 7,558,446 B2 | 7/2009 | Wimberger-Friedl et al. | |
| 7,831,126 B2 | 11/2010 | Foerster et al. | |
| 7,833,802 B2* | 11/2010 | Henry | G01N 1/24 250/282 |
| 8,003,408 B2* | 8/2011 | Zhang | B82Y 30/00 424/490 |
| 8,237,927 B1* | 8/2012 | Reeve | G01J 3/10 356/432 |
| 8,363,215 B2* | 1/2013 | Henry | G01J 3/02 356/300 |
| 8,377,711 B2* | 2/2013 | Henry | G01N 21/658 356/36 |
| 8,431,409 B1* | 4/2013 | Meinhart | G01N 21/05 436/168 |
| 8,759,791 B1 | 6/2014 | Hug et al. | |
| 8,948,560 B1 | 2/2015 | Wach | |
| 9,007,593 B2 | 4/2015 | Sailor et al. | |
| 9,176,059 B2 | 11/2015 | Lear et al. | |
| 9,417,404 B1 | 8/2016 | Barwicz et al. | |
| 9,429,718 B1 | 8/2016 | Barwicz et al. | |
| 2002/0024662 A1* | 2/2002 | Ueno | G01N 21/0332 356/246 |
| 2002/0191884 A1* | 12/2002 | Letant | G01N 33/54373 385/12 |
| 2003/0161572 A1 | 8/2003 | Johnck et al. | |
| 2004/0056196 A1* | 3/2004 | Yoshida | G01N 21/3504 250/336.1 |
| 2005/0226775 A1* | 10/2005 | Aker | G01N 21/05 422/82.08 |
| 2006/0262303 A1* | 11/2006 | Bonne | G01F 1/6845 356/328 |
| 2007/0020144 A1* | 1/2007 | Du | B82Y 15/00 422/400 |
| 2007/0035819 A1 | 2/2007 | Bahatt et al. | |
| 2007/0077176 A1* | 4/2007 | Lambert | B60K 28/063 422/82.05 |
| 2007/0113642 A1* | 5/2007 | Bonne | G01N 21/65 73/204.11 |
| 2008/0008625 A1* | 1/2008 | Thomas | G01N 1/2214 422/82.05 |
| 2008/0151248 A1* | 6/2008 | Cole | G01J 3/02 356/437 |
| 2008/0182136 A1* | 7/2008 | Arnold | G01N 21/66 429/7 |
| 2010/0055802 A1* | 3/2010 | Zare | G01N 21/39 436/158 |
| 2010/0079764 A1* | 4/2010 | Spartz | G01N 21/031 356/451 |
| 2010/0098592 A1 | 4/2010 | Rong et al. | |
| 2010/0223015 A1* | 9/2010 | Phillips | G01J 3/02 702/24 |
| 2011/0128537 A1* | 6/2011 | Bond | G02B 6/107 356/301 |
| 2011/0149589 A1 | 6/2011 | Ko et al. | |
| 2011/0194115 A1* | 8/2011 | Levitsky | G01N 21/05 356/442 |
| 2011/0271738 A1* | 11/2011 | McGill | G01N 21/64 73/23.41 |
| 2012/0081703 A1* | 4/2012 | Moskovits | G01N 21/658 356/301 |
| 2012/0155821 A1 | 6/2012 | Dangel et al. | |
| 2012/0175515 A1* | 7/2012 | Hori | G01N 27/622 250/282 |
| 2012/0328233 A1* | 12/2012 | Chakravarty | B82Y 20/00 385/12 |
| 2013/0081447 A1* | 4/2013 | Carter | G02B 6/10 73/30.01 |
| 2013/0193325 A1* | 8/2013 | Phillips | G01N 21/3504 250/339.07 |
| 2013/0253360 A1 | 9/2013 | Wang et al. | |
| 2014/0187870 A1* | 7/2014 | Weber | A61B 10/0266 600/301 |
| 2014/0293283 A1* | 10/2014 | Farooq | G01N 33/0054 356/437 |
| 2015/0223739 A1* | 8/2015 | Walavalkar | A61B 5/0075 600/342 |
| 2015/0355178 A1* | 12/2015 | Myatt | G01N 33/56988 435/5 |
| 2016/0018263 A1* | 1/2016 | Adato | G01N 21/658 250/339.02 |
| 2016/0067666 A1* | 3/2016 | Walavalkar | B01J 19/0046 506/30 |
| 2016/0193588 A1* | 7/2016 | Haynes | B01J 20/28021 424/9.1 |
| 2017/0059469 A1 | 3/2017 | Hutter | |

FOREIGN PATENT DOCUMENTS

| | | |
|---|---|---|
| WO | 2007043005 A1 | 4/2007 |
| WO | 2015166237 A1 | 11/2015 |

OTHER PUBLICATIONS

Tanya Hutter et al, Theoretical Study of Porous Silicon Waveguides and Their Applicability for Vapour Sensing; COMSOL Conference 2010 Paris, pp. 1-7.

M. V. Chistiakova and A. M. Armani, Optical Detection of CO and CO2 Temperature Dependent Desorption from Carbon Nanotube Clusters; Nanotechology (2014) 25, 395201 (9 pages).

\* cited by examiner

ANALYTE SENSOR AND METHOD OF USE

RELATED APPLICATION

This application claims the benefit of U.S. Provisional Application No. 62/206,345, filed Aug. 18, 2015, and U.S. Provisional Application No. 62/207,954, filed Aug. 21, 2015, each of which is incorporated by reference in its entirety.

FIELD OF THE INVENTION

The presently disclosed subject matter relates to the field of analyte sensing. More specifically, the present disclosure relates to an analyte sensor for sensing volatile organic compound analytes and a method of use of the same for isolating, identifying, and quantifying one or more analytes in a sample.

BACKGROUND OF THE INVENTION

Gas Chromatography (GC) coupled with Mass Spectrometry (MS), or GCMS, is the gold standard for analyzing volatile organic compounds (VOCs) and is also the most frequently used method. GCMS systems have the highest sensitivity and selectivity of analytical devices available today. The GC system separates the species based on their boiling points or polarity. Separated compounds are sequentially introduced to the MS system. Inside the MS system, analytes are ionized and further separated by mass to charge ratio. By comparing relative abundance of ionized fragments to a standard database, analytes can be uniquely identified. However, GCMS systems are unable to perform real-time analysis. Selective Ion Flow Tube Mass Spectrometry (SIFT-MS) and Proton Transfer Mass Spectrometry (PMT-MS) are more suited for real-time online analysis and have detection limits ranging from parts per billion (ppb) to parts per trillion (ppt).

The complexity, high cost, and lack of portability of MS-based systems has led to the development of sensor-based analyzers for rapid analysis. One such sensor technology is the electronic nose. An electronic nose is an array of non-selective sensors with varying sensitivities. Responses of the sensors in the array correlate to the composition of the sample rather than a concentration of a single constituent. Usually, a pattern recognition algorithm is used to differentiate two different compositions, such as breath samples from diseased individuals and breath samples from healthy individuals. An electronic nose with eight quartz microbalance sensors with metalloporphyrins is used to identify lung cancer patients from healthy persons and patients with other lung diseases. Discriminant analysis solved by partial least squares cross-validated by "leave-one-out" technique is used to classify the data. The classification is able to obtain a success rate of 79.3% in discrimination between lung cancer, other lung diseases and the controls. Generally, semiconductor VOC sensors have poor selectivity; however, there are VOC-specific sensors for detection of certain VOCs. A chemo-resistive sensor based portable device has been able to measure variation in acetone concentration of a person at rest and during physical activity. Acetone concentrations obtained using the device are validated by parallel measurements taken using a PTR-MS. The sensor is fabricated by depositing 10 mol % Si-doped $WO_3$ nanostructures on an $Al_2O_3$ substrate with interdigitated Pt electrodes. The sensor shows highly selective response to acetone at 350° C. A device consisting of commercially available tin oxide sensor and custom made platinum doped tungsten oxide sensor has shown its ability of direct breath acetone analysis with a detection range of 0.2-50 parts per million (ppm) and with a 0.1 ppm resolution. The Pt-doped sensor shows high selectivity to acetone in 1-100 ppm range. The device is used to monitor fat-burning of individuals by using breath acetone concentration as the indicator. Quartz crystal microbalance sensors also have been used for quantification of trace level VOCs. Quartz crystal microbalance sensors determine the amount of mass absorbed using the change in frequency according to the Sauerbrey equation. An Ag+-ZSM-5 zeolite coated quartz crystal microbalance sensor is able to analyze acetone with a high selectivity. Zeolite acts as the selective layer by trapping molecules smaller than cavities in zeolite. The selectivity of the sensor is further increased by introducing Ag+ into the selective layer. These sensors are able to quantify 1.2 ppm acetone in nitrogen and also to distinguish breath samples of diabetes patients from healthy individuals based on the breath acetone concentration. However, quartz crystal microbalance sensors are highly sensitive to flow rate, humidity and temperature.

Optical sensors have attractive features over semiconductor sensors for detection of VOCs. Optical sensors measure the amount of light absorbed by a compound. The amount of light absorbed is proportional to its concentration according to the Beer-Lambert Law. Optical VOC sensors have fast response times and high specificity for a particular compound. However, absorption measured in a gaseous sample is extremely weak and beyond the detectable range of most analytical instruments. Various methods such as the Cavity Ring Down Spectroscopy (CRDS) have been developed to amplify absorption in order to detect trace level concentrations. In this method, incident light is reflected between two mirrors to increase the optical path length. The reflectivities of the mirrors are slightly below 100%. Decaying speed of the light after the light source is turned off is increased due to presence of compounds. CRDS method is used in 10 cm atmospheric cavity in a portable acetone breathalyzer. The system uses a tunable laser as the light source and photomultiplier tube connected to an oscilloscope to measure the ring down signal. The system is able to achieve limit of detection of 1.5 ppm for acetone in nitrogen. Absorption in the evanescent field of fiber optics is a commonly used technique to detect gases and VOCs. Light guided in the sensor penetrates into the cladding layer. The cladding layer is made from a polymer and has a high solubility to the compound(s) of interest and works as a pre-concentrator. The evanescent field in the cladding layer interacts with the compound of interest and the Beer-Lambert Law can be applied to derive the concentrations. A 0.5 m long silica fiber with a PDMS cladding layer is developed to detect toluene based on the UV absorption of the evanescent field. Thickness of the PDMS cladding layer is 15 µm. The response time of the sensor is below 1 s, possibly due to low thickness of the cladding layer. Fiber is bent into a coil to increase the penetration depth of the evanescent waves into the cladding layer. The bending of the fiber increases the detection limit and also makes the sensor more compact. The sensor has a detection limit of in the ppm range for toluene in nitrogen.

The main limitation of the state of the art sensor technology is poor selectivity. The analytical value of nonselective technologies such as electronic noses has been brought into question. Most of the dedicated sensors reported are limited to a few VOCs, where the VOC of interest has a relative high concentration. A need exists for a sensor capable of qualitatively and quantitatively analyzing a multi-VOC sample with concentrations below 1 ppm.

SUMMARY OF THE INVENTION

Provided herein is a sensor, sensor assembly, and method of use for isolating, identifying, and quantifying one or more analytes in a sample.

In one embodiment, a sensor is provided, the sensor comprising: a metal substrate; and a polymer waveguide disposed on the metal substrate, the polymer waveguide comprising an optical channel and a polymer disposed in the optical channel; wherein the polymer waveguide optically couples a first and a second fiber optic cable.

In another embodiment, a sensor assembly is provided, the sensor assembly comprising: a sensor; a holder configured to receive the sensor; a light source optically coupled to the sensor; an optical detector optically coupled to the sensor; a pump for pumping a sample into a sample chamber; and a heater thermally connected to the sensor.

In another embodiment, a method of isolating, identifying, and quantifying one or more analytes in a sample is provided, the method comprising: adjusting a temperature of a polymer waveguide to a first temperature threshold; contacting a polymer waveguide with the sample, whereby the one or more analytes in the sample are captured and pre-concentrated in the polymer waveguide; optionally heating the polymer waveguide to a second temperature threshold and maintaining the second temperature threshold for a predetermined period of time, whereby compounds having a desorption temperature at or below the second temperature threshold are desorbed from the polymer waveguide; transmitting light through the polymer waveguide to provide a first optical output; detecting the first optical output with an optical detector; heating the polymer waveguide to a third temperature threshold and maintaining the third temperature threshold for a predetermined period of time, whereby an analyte of interest having a desorption temperature at or at or below the third temperature threshold and above the second temperature threshold is desorbed from the polymer waveguide; transmitting light through the polymer waveguide to provide a second optical output; detecting the second optical output with the optical detector; determining an absorption spectrum of the analyte of interest by analyzing a difference between the first optical output and the second optical output; and quantifying a concentration of the analyte of interest based on the absorption spectrum of the analyte of interest.

These and other objects, features, embodiments, and advantages will become apparent to those of ordinary skill in the art from a reading of the following detailed description and the appended claims.

DETAILED DESCRIPTION OF THE INVENTION

The details of one or more embodiments of the presently-disclosed subject matter are set forth in this document. Modifications to embodiments described in this document, and other embodiments, will be evident to those of ordinary skill in the art after a study of the information provided in this document.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Provided herein is an analyte sensor and method of use for isolating, identifying, and quantifying analytes in a sample. The subject matter of the present disclosure is better understood upon review of the figures, wherein like parts are identified by like reference numbers.

Figure 1:
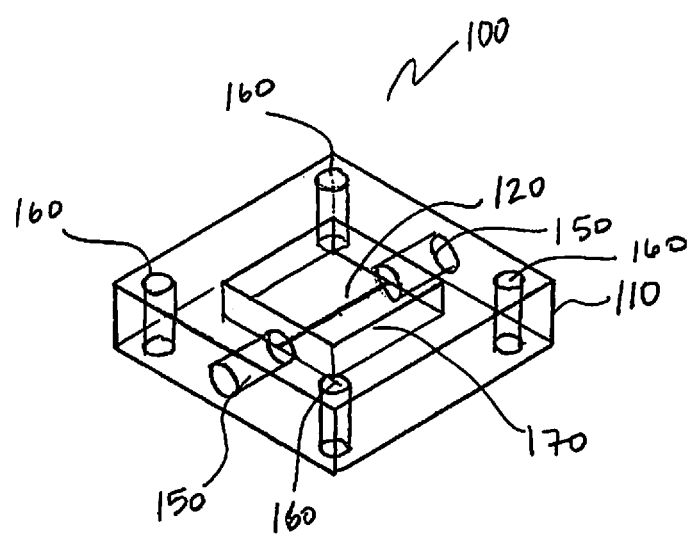
FIG. 1 shows a schematic view of a sensor.
Figure 2:
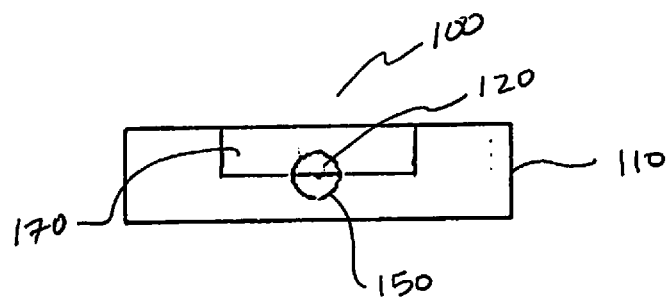
FIG. 2 shows a cross-sectional view of a sensor
Figure 3:
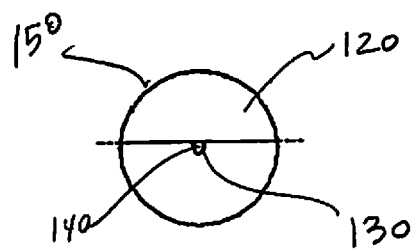
FIG. 3 shows a cross-sectional view of a polymer waveguide.

FIG. 1-3 show a schematic view of an embodiment of a sensor 100 (FIG. 1), a cross-sectional view of an embodiment of a sensor 100 (FIG. 2), and a cross-sectional view of a polymer waveguide 120 (FIG. 3). The sensor 100 comprises a metal substrate base 110 and a polymer waveguide 120, which comprises an optical channel 130 having a polymer 140 disposed therein. The polymer waveguide 120 optically couples a first and second fiber optic cable (not shown), each of which connects to the polymer waveguide 120 via a fiber optic ferrule connector 150 in the metal substrate base 110. A sample cavity 170 is disposed on the metal substrate base 110, for containing the sample pumped into the sensor 100. The metal substrate base 110 optionally comprises a plurality of fastening holes 160 for permitting the sensor to be fastened to other components, such as a cap and/or sensor holder. In some embodiments, the metal substrate base 110 comprises a plurality of screw holes, disposed at each corner of the metal substrate base 110.

The metal substrate base 110 can be formed from a variety of metals, including but not limited to aluminum, aluminum alloy, silver, silver alloy, and combinations thereof. The metal substrate base can be formed of any metal that has a refractive index below the refractive index of the polymer waveguide. In certain embodiments, the metal substrate base 110 is coated with a material that has a lower refractive index than the polymer waveguide 120. Examples of suitable coatings include, but are not limited to, Teflon™ AF, Teflon™, polylactic acid, and combinations thereof.

In some embodiments, the optical channel 130 is milled across the approximate center of a top surface of the metal substrate base 110. One skilled in the art will appreciate that the dimensions and shape of the optical channel 130 are not limited to the embodiments illustrated herein. In certain embodiments, the optical channel 130 is U-shaped. In a specific embodiment, the optical channel 130 is about 200 μm wide and about 200 μm deep. In another specific embodiment, the optical channel 130 is about 10 mm in length. However, it is understood that any shape, dimension, or configuration of the optical channel 130 that permits light propagation through the polymer waveguide 120 is suitable for use herein.

The polymer 140 is selected to capture and pre-concentrate analytes from the sample. In chemical analysis, pre-concentration is a process of increasing concentration of analyte(s) of interest to a detection range of an analytical instrument. The polymer 140 suitable for use in the present sensor is a porous polymer in which analytes, and particularly VOCs, have high solubility. When a sample passes through the polymer waveguide 120, analytes in the sample are captured and pre-concentrated in the polymer 140, such that the concentration of analytes in the polymer 140 of the polymer waveguide 120 is several orders of magnitude higher than the concentration of the analytes in exposed environment.

Various porous polymers 140 are suitable for use in the presently disclosed sensor 100. In certain embodiments, the polymer 140 is a polymer having a siloxane functional group as a repeatable unit of the polymer. In a specific embodiment, the polymer is selected from the group consisting of crosslinked polydimethylsiloxane, hydroxy terminated polydimethylsiloxane, and combinations thereof. In a very specific embodiment, the polymer is crosslinked polydimethylsiloxane. In certain embodiments, crosslinked polydimethylsiloxane is prepared by mixing 20 parts base with 1 part curing agent.

The first and second fiber optic cables each comprise a subminiature version A (SMA) connector having a ferrule end (not shown). The ferrule end of the fiber optic cable is inserted into the fiber optic ferrule connector 150 of the metal substrate 110, such that the fiber optic cables are optically coupled to the polymer waveguide 120. In some embodiments, the ferrule ends of the fiber optic cables and the optical channel 130 are aligned. In a specific embodiment, the ferrule ends of the fiber optic cables and the optical channel 130 are concentric.

At a fixed temperature, the concentration in the polymer waveguide 120 ($C_{polymerwaveguide}$) and concentration in the sample ($C_{sample}$) can be described using the Nernst distribution law:

$$K = C_{polymerwaveguide}/C_{sample} \qquad (1)$$

wherein K is the distribution coefficient at equilibrium, $C_{polymerwaveguide}$ is the concentration of the analyte in the polymer 140, and $C_{sample}$ is the concentration of the analyte in the exposed environment. When the sensor 100 is exposed to a gaseous or liquid sample, the analyte in the sample is captured by the polymer 140 in the polymer waveguide 120.

Figure 4:
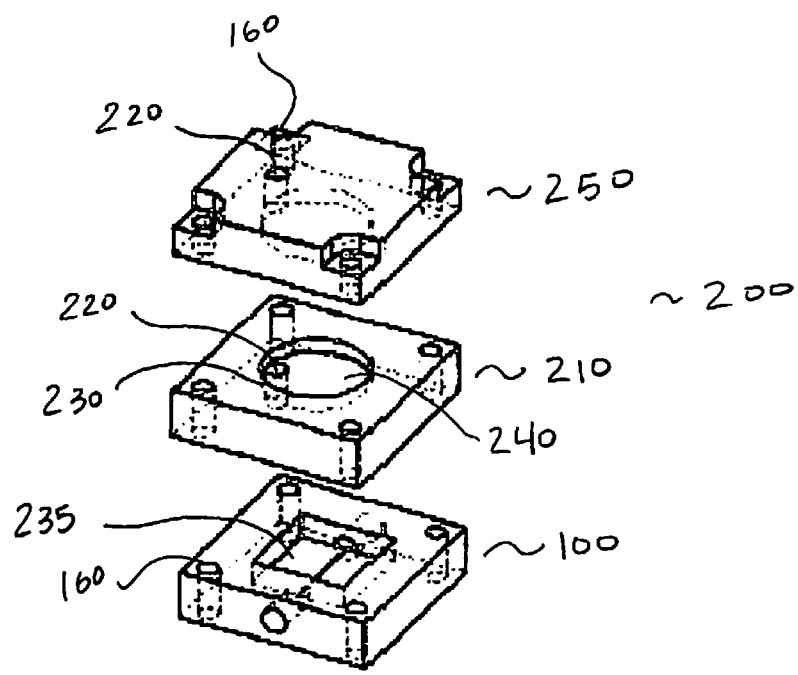
FIG. 4 shows an exploded view of a sensor and sensor cap assembly.
Figure 5:
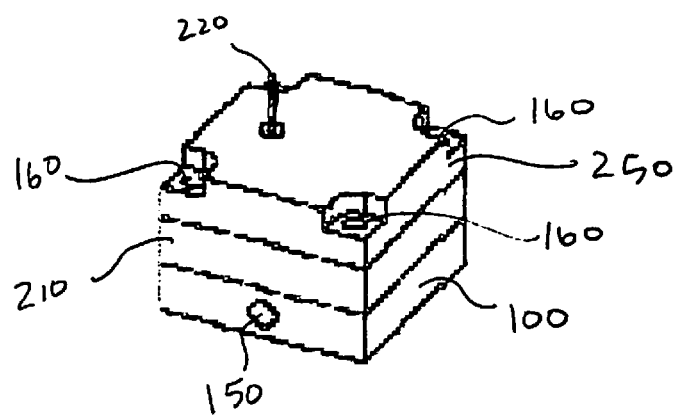
FIG. 5 shows a schematic view of a sensor and sensor cap assembly.

FIG. 4 shows an exploded view of a sensor 100 with sensor cap assembly 200. The sensor cap assembly comprises a first sensor cap 210 and a second sensor cap 250. The first sensor cap 210 comprises a septum 240 and a septum holder 230. When the first sensor cap 210 is disposed on a top surface of the sensor 100, the septum 240 at least partially seals the sensor cavity 170 to form a sample chamber 235 for containing the sample. The sensor caps 210 and 250 each comprise an injection port 220 for delivering the sample to the sample chamber 235. When the sensor 100, first sensor cap 210, and second sensor cap 250 are assembled together, the injection ports 220 of the first and second sensor caps at least partially align to permit sample delivery to the sample chamber. The sensor caps 210 and 250 also comprise fastening holes 160 which align with the fastening holes 160 of the metal substrate base 110. The sensor 100, first sensor cap 210, and second sensor cap 250 can be fastened together, for example by screws, rivets, or clips inserted through the fastening holes 160. FIG. 5 shows a sensor 100 with first sensor cap 210 and second sensor cap 250 assembled together. The sensor 100 and sensor cap assembly 200 are fastened together via fastening holes 160, which are secured using screws, rivets, or clips.

Figure 6:
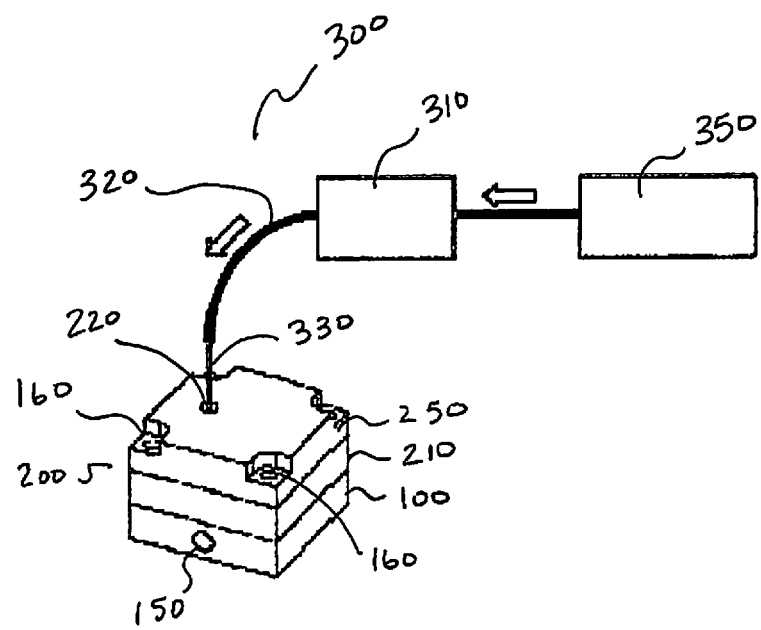
FIG. 6 shows a schematic view of a sensor system.

FIG. 6 shows a sensor system 300, comprising a sensor 100, sensor cap assembly 200 comprising a first sensor cap 210 and a second sensor cap 250, and a pump 310. The pump 310 pumps the sample 350 through the injection port 220 into the sample chamber (not shown). In one embodiment, the sample is pumped through tubing 320 and into the injection port 220 through a needle 330.

Figure 7:
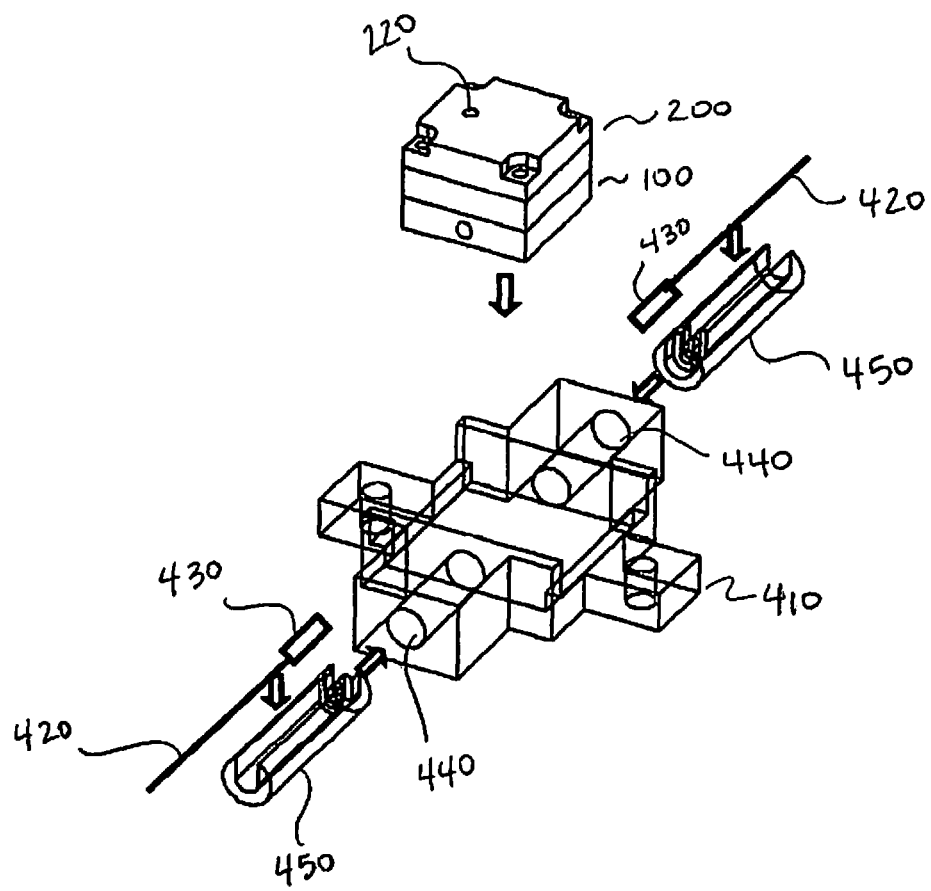
FIG. 7 shows an exploded view of a sensor, sensor cap assembly, and sensor holder.

FIG. 7 shows a holder 410 configured to receive the sensor 100 and sensor cap assembly 200. The holder securely connects the fiber optic cables 420 to the sensor 100. The sensor 100 is optically coupled to a light source (not shown) via a first fiber optic cable 420, having an SMA connector (not shown) having a ferrule end 430. The sensor 100 is optically coupled to an optical detector (not shown) via a second fiber optic cable 420 having an SMA connector having an SMA connector with a ferrule end 430. Each of the fiber optic cables 420 having a ferrule end 430 is at least partially enclosed in a fiber optic cable screw 450. Each fiber optic cable screw 450 passes through a fiber optic screw hole 440 in the holder 410. Once the fiber optic cable screws 450 are tightened, the vertical face of the fiber optic cable ferrule ends 430 are firmly pressed against the vertical walls of the optical channel (not shown), such that the core of the fiber optic cables is aligned with the polymer-filled optical channel, thus completing the optical circuit. A pump (not shown) pumps the sample to the sensor through the injection port 220 and into the sample chamber (not shown).

Light is transmitted from the light source through the first fiber optic cable 420, polymer waveguide, and second fiber optic cable 420 to the optical detector to complete the optical circuit. Various light sources are suitable for use in the instant systems and methods. In certain embodiments, the light source is selected from the group consisting of a halogen lamp, a deuterium lamp, a broad spectrum light emitting diode (LED) source, a single wavelength LED source, a single wavelength laser source, and combinations thereof. Various optical detectors are suitable for use in the instant systems and methods. In certain embodiments, the optical detector is a spectrometer or a photodetector. As used herein, a photodetector includes, but is not limited to, a photomultiplier, a phototransistor, a photodiode, or an avalanche photodiode.

A heater (not shown) is thermally connected to the sensor 100, such that the temperature of the sensor can be adjusted and/or increased in accordance with the methods disclosed herein.

Figure 8:
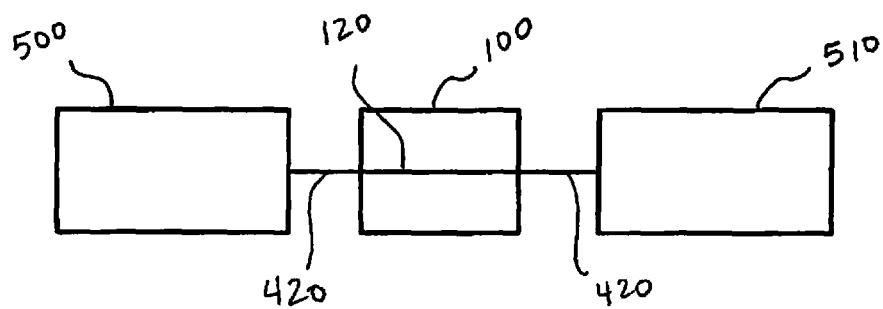
FIG. 8 shows a block diagram of a sensor, light source, and optical detector.

FIG. 8 is a block diagram depicting the sensor 100, light source 500, and optical detector 510, optically coupled through the polymer waveguide 120 via first and second fiber optic cables 420.

Heat Stripping Absorption Spectroscopy (HSAS)

Provided herein is a method of qualitatively and quantitatively analyzing samples containing one or more analytes. As used herein, "analyte" refers to a compound in a sample to be identified and quantified by concentration. In certain embodiments, the analyte is a volatile organic compound (VOC). A VOC is an organic compound having a high vapor pressure at ordinary room temperature, which causes large numbers of molecules to evaporate or sublimate from the liquid or solid form of the compound and enter the surrounding air, a trait known as volatility. The analyte(s) of interest may include VOCs such as acetone, benzene, toluene, ethylbenzene xylenes, d-limonene, styrene, naphthalene, formaldehyde, and the like.

The samples suitable for use in the sensors and methods of the present invention include either liquid or gaseous samples containing one or more analytes of interest. In certain embodiments, the sample is an air sample, for example, an air sample from an industrial environment.

In one embodiment, a method of isolating and quantifying one or more analytes in a sample is provided, the method comprising: adjusting a temperature of a polymer waveguide to a first temperature threshold; contacting the polymer waveguide with the sample, whereby the one or more analytes in the sample are captured and pre-concentrated in the polymer waveguide; optionally heating the polymer waveguide to a second temperature threshold and maintaining the second temperature threshold for a predetermined period of time, whereby compounds having a desorption temperature at or below the second temperature threshold are desorbed from the polymer waveguide; transmitting light through the polymer waveguide to provide a first optical output; detecting the first optical output with an optical detector; heating the polymer waveguide to a third temperature threshold and maintaining the third temperature threshold for a predetermined period of time, whereby an analyte of interest having a desorption temperature at or below the third temperature threshold and above the second temperature threshold is desorbed from the polymer waveguide; transmitting light through the polymer waveguide to provide a second optical output; detecting the second optical output with the optical detector; determining an absorption spectrum of the analyte of interest by analyzing a difference between the first optical output and the second optical output; and quantifying a concentration of the analyte of interest based on the absorption spectrum of the analyte of interest.

As used herein, the term "first temperature threshold" refers to a temperature sufficient to allow any analytes in the sample to be captured and pre-concentrated in the polymer of the polymer waveguide. In the methods described herein, the temperature of the polymer waveguide is adjusted to a first temperature threshold prior to contacting the polymer waveguide with a sample. Adjusting and/or heating the polymer waveguide is accomplished by a heater placed in thermal connection with the sensor.

Once analytes have been captured and pre-concentrated, the polymer waveguide is optionally heated to a second temperature threshold. As used herein, "second temperature threshold" refers to a temperature sufficient to permit any compounds that are weakly absorbed to the polymer waveguide to be desorbed, or removed. Such compounds include, for example, acetone, formaldehyde, and the like. Generally, compounds that desorb from the polymer waveguide at or below the second temperature threshold do not include analytes of interest in the sample. The second temperature threshold is maintained for a predetermined period of time, whereby compounds having a desorption temperature at or below the second temperature threshold are desorbed from the polymer waveguide. The predetermined period of time is selected to ensure that all analytes with desorption temperatures less than the analyte(s) of interest are completely desorbed from the polymer waveguide. More specifically, the predetermined period of time is set to ensure complete desorption of analytes that were loaded into the polymer from gas samples with analyte concentrations up to about 100 ppm. In certain embodiments, the predetermined period of time ranges from about 30 seconds to about 20 minutes, from about 1 minute to about 20 minutes, from about 1 minute to about 15 minutes, from about 1 minute to about 10 minutes, from about 2 minutes to about 10 minutes, from about 3 minutes to about 10 minutes, from about 4 minutes to about 10 minutes, from about 5 minutes to about 10 minutes, or from about 30 seconds to about 1 minute. In another embodiment, the predetermined period of time is about 5 minutes. In certain embodiments, the step of heating to a second temperature threshold and maintaining the second temperature threshold can be omitted, if no weakly bound compounds are believed to be present in the sample.

Once any weakly absorbed compounds are removed or desorbed from the polymer waveguide, light is transmitted through the polymer waveguide to provide a first optical output. As used herein, "first optical output" refers to an optical output of the polymer waveguide, wherein analyte(s) of interest are absorbed and pre-concentrated in the polymer waveguide. In certain embodiments, the first optical output comprises a transmittance spectrum or transmittance intensity value obtained by transmitting light from a light source through the polymer waveguide to the optical detector. The first optical output is detected by the optical detector.

The polymer waveguide is then heated to a third temperature threshold. As used herein, "third temperature threshold" refers to a temperature sufficient to permit an analyte of interest to desorb from the polymer waveguide. The third temperature threshold is maintained for a predetermined period of time, whereby an analyte of interest having a desorption temperature at or below the third temperature threshold and above the first and/or second temperature threshold is desorbed from the polymer waveguide. More specifically, the predetermined period of time is set to ensure complete desorption of analytes that were loaded into the polymer from gas samples with analyte concentrations up to about 100 ppm. Analytes of interest include, but are not limited to, acetone, benzene, toluene, ethylbenzene xylenes, d-limonene, styrene, naphthalene, formaldehyde, and the like. The predetermined period of time is selected to ensure that the first analyte of interest is completely desorbed from the polymer waveguide. In certain embodiments, the predetermined period of time ranges from about 30 seconds to about 20 minutes; from about 1 minute to about 20 minutes, from about 1 minute to about 15 minutes, from about 1 minute to about 10 minutes, from about 2 minutes to about 10 minutes, from about 3 minutes to about 10 minutes, from about 4 minutes to about 10 minutes, from about 5 minutes to about 10 minutes, or from about 30 seconds to about 1 minute. In another embodiment, the predetermined period of time is about 5 minutes.

Once an analyte of interest is removed or desorbed from the polymer waveguide, light is transmitted through the polymer waveguide to provide a second optical output. As used herein, "second optical output" refers to an optical output obtained by transmitting light through the polymer waveguide, wherein a first analyte of interest (as well as any other compounds having desorption temperatures below the first and second temperature thresholds) has been desorbed from the polymer waveguide. In certain embodiments, the second optical output comprises a transmittance spectrum or transmittance intensity value. The second optical output is detected by the optical detector.

An absorption spectrum of the analyte(s) of interest is determined by analyzing a difference between the first optical output and the second optical output. Optical outputs (e.g., first, second, third, and subsequent optical outputs) can be provided as absorption spectra or measurements of optical intensity. In certain embodiments, the optical detector is a spectrometer and the optical outputs comprise absorption spectra. In other embodiments, the optical detector is a photodetector and the optical outputs comprise optical intensity measurements.

Figure 9:
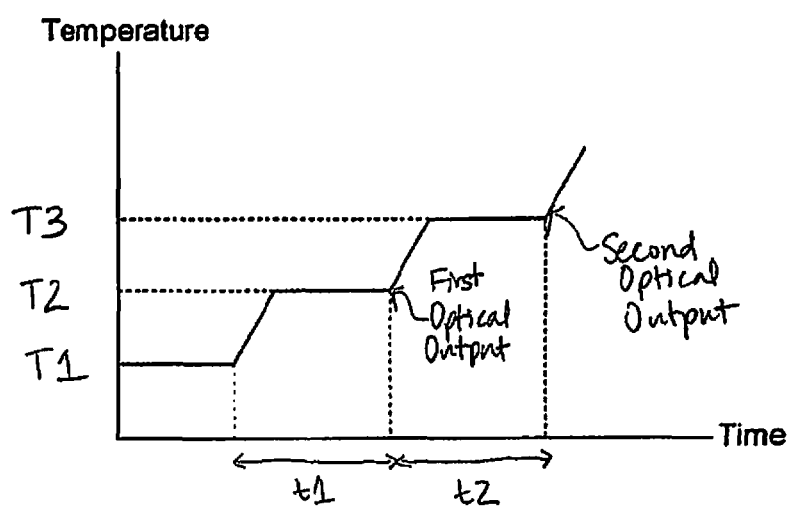
FIG. 9 illustrates the temperature profile of a heat stripping absorption spectroscopy (HSAS) method of isolating, identifying, and quantifying an analyte of interest in a sample.

FIG. 9 illustrates a method of heat stripping absorption spectroscopy for removal of a single analyte from a sample, although the skilled artisan will appreciate that the method can be expanded to sequentially remove additional analytes from the sample. The polymer waveguide is considered a liquid matrix and when the temperature is increased stepwise, analytes are stripped in the reverse order of their desorption temperature values. T1 is a first temperature threshold, whereby analytes from a sample are captured and pre-concentrated in the polymer waveguide. The temperature is rapidly increased to T2, a second temperature threshold, and maintained for a predetermined period of time t1, whereby compounds having a desorption temperature at or below T2 are desorbed from the polymer waveguide. A first optical output is collected at the end of t1. T3 is a third temperature threshold, maintained for a predetermined period of time t2, whereby an analyte of interest having a desorption temperature at or below T3 is desorbed from the polymer waveguide. A second optical output is collected at the end of t2. Identification and quantification of the analyte of interest is carried out by analyzing a difference between the first and second optical outputs. Absorption due to the compound of interest at a particular wavelength is given by equation (2), where $A_{analyte}$ is the absorbance due to the analyte of interest that desorbs at temperature T2, Output 1 is an optical spectrum intensity that is dependent upon all analytes with desorption temperatures greater than temperature T2. Output 2 is an optical spectrum intensity that is dependent on all analytes with desorption temperatures greater than T3:

$$A_{analyte} = \text{Output 1} - \text{Output 2} \tag{2}$$

$A_{analyte}$ is proportional to the concentration of the analyte in the exposed sample.

Concentration of the analyte of interest is quantified based on a comparison of the optical outputs. In certain embodiments, concentration of the analyte of interest is determined by comparing an integrated optical absorption over a predetermined wavelength range of the analyte of interest with an integrated optical absorption over said predetermined wavelength range of a known concentration of the analyte of interest. As used herein, the term "integrated optical absorption" refers to numerical integration to find the area under the curve (AUC) of an optical absorption spectrum with the predetermined wavelength range. The predetermined wavelength is chosen based on the optical absorption characteristics associated with the analyte of interest.

The sensor uses absorption spectroscopy to quantitatively determine a concentration of the analyte in the sample. According to the Beer-Lambert Law, light absorbance (A) and the concentration of the analyte in the polymer waveguide ($C_{polymerwaveguide}$) can be expressed as shown in equation (3), where $I_0$ is the incident light, I is the light transmitted, $\epsilon$ is the absorptivity of the gas, and l is the optical path length:

$$A = \exp(I_0/I) = \epsilon\, C_{polymer}\, l \tag{3}$$

The relationship between the concentration of the analyte in the exposed environment (sample) and the concentration of the analyte in the polymer can be described by the Nernst distribution law and expressed in equation (1).

Equation (4) expresses the relationship between the concentration of the analyte in the sample and the optical absorbance by combining equations (1) and (3).

$$A = \epsilon\, K C_{sample}\, l \tag{4}$$

The absorption bands of analytes depend on the properties of each analyte. Absorption A is determined for various analyte concentrations to obtain a calibration curve. The calibration curve is then used in sample analysis to determine concentration in the sample using absorption A. In the heat stripping spectroscopy methods disclosed herein, A is integrated optical absorption.

The sensor and methods described herein are useful for isolating and quantifying more than one analyte of interest in a sample. In order to isolate and quantify additional analyte(s) of interest, the steps of heating the polymer waveguide, transmitting light through the polymer waveguide, detecting an optical output, and determining an absorption spectrum are repeated such that a series of analytes of interest in the sample are sequentially desorbed from the polymer waveguide, wherein each sequentially detected optical output is compared to the optical output detected at a previous temperature threshold to quantify a concentration of each analyte of interest in the series of analytes of interest in the sample.

For example, in one embodiment, the method further comprises heating the polymer waveguide to a fourth temperature threshold and maintaining the fourth temperature threshold for a predetermined period of time, whereby a second analyte of interest having a desorption temperature at or below the fourth temperature threshold and above the third temperature threshold is desorbed from the polymer waveguide; transmitting light through the polymer waveguide to provide a third optical output; detecting the third optical output with the optical detector; determining an absorption spectrum of the second analyte of interest by analyzing a difference between the second optical output and the third optical output; and quantifying a concentration of the second analyte of interest based on the absorption spectrum of the second analyte of interest. Quantifying the concentration of the second analyte of interest is accomplished in the same manner as described above.

Analyte is identified using the temperature threshold at which the analyte is desorbed from the polymer waveguide and the absorption spectrum of the analyte. According to the heat stripping absorption spectroscopy, one or more compounds from the sample are absorbed into the polymer waveguide, but during desorption, the analyte is selectively removed from the polymer waveguide at the particular temperature threshold. Desorption temperatures from various compounds are experimentally obtained. Hence, analytes that can be desorbed at a certain temperature threshold are known and the desorption temperature can be used to identify an analyte. Analyte identification is further accomplished by comparing the absorption spectrum of the analyte with the absorption spectrum of the compound that is known to desorb at the same temperature threshold.

The sensors and methods provided herein have applications in various fields of study including, but not limited to, medical diagnosis, environmental/occupational exposure monitoring, explosives/narcotic substance detection, and industrial process control.

EXAMPLES

The following examples are given by way of illustration and are in no way intended to limit the scope of the present invention.

Example 1

Isolating, Identifying, and Quantifying Toluene from a Sample Comprising Ethylbenzene, O-Xylene, and Nitrogen A test sample is prepared by injecting 2 µL of toluene, ethylbenzene, and o-xylene into a gas sampling bag filled with 6 L nitrogen. The concentrations are as follows: 143 ppm toluene, 125 ppm ethylbenzene, 125 ppm o-xylene. The test sample is left at room temperature for 0.5 hours to reach equilibrium.

Figure 10:
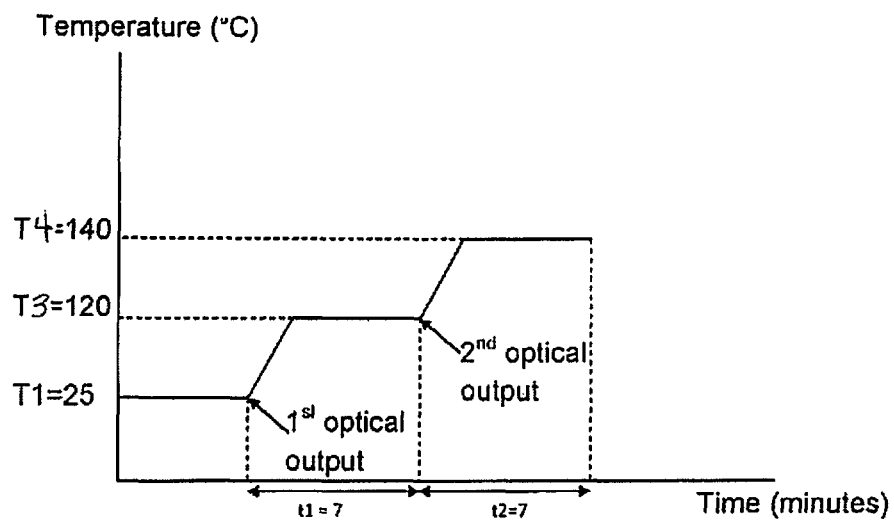
FIG. 10 is a graphical representation of a heat stripping absorption spectroscopy (HSAS) temperature profile for a test sample.
Figure 11:
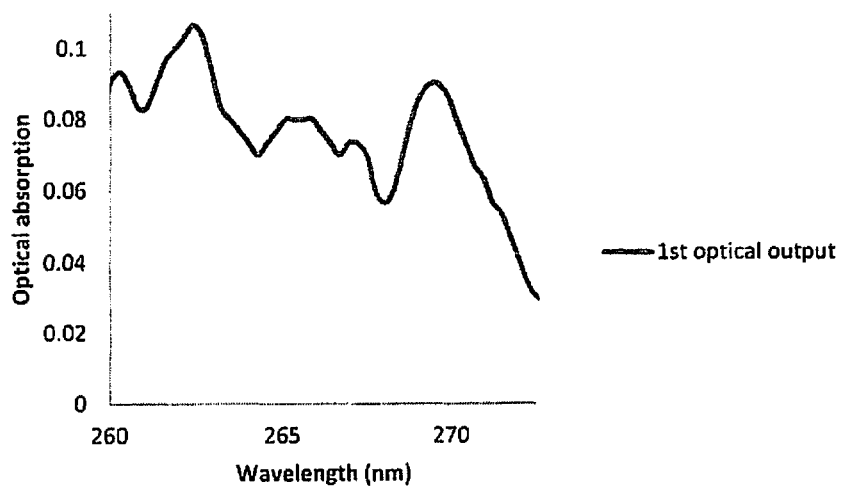
FIG. 11 is an absorption spectrum (first optical output) of a sample at the first temperature threshold (T1).

A laboratory hotplate is used as the heating source. Temperature of a polymer waveguide is adjusted to 25° C. (T1, first temperature threshold), as shown in FIG. 10, and 150 ml volume of the test sample is pumped into the sensor at a constant flow rate, contacting the polymer waveguide, whereby one or more analytes in the sample are captured and pre-concentrated in the polymer waveguide. In this instance, the test sample is prepared with known analytes, so the steps of heating the polymer waveguide to a second temperature threshold (T2) and maintaining the second temperature threshold for a predetermined period of time in order to desorb weakly bound compounds is not carried out. If the method is carried out using a sample with unknown analytes, the polymer waveguide temperature is heated to a second temperature threshold (T2) of about 66° C. and maintained for a predetermined period of time, which permits weakly bound compounds such as acetone to desorb from the polymer waveguide, and the first optical output is collected at that point. In this instance, after heating the polymer waveguide to 25° C. (T1), light is transmitted through the polymer waveguide to provide the first optical output, which is detected using a spectrometer. The absorption spectrum of the first optical output is shown in FIG. 11.

The first optical output is the optical absorption spectrum that is dependent upon all analytes with desorption temperatures greater than 25° C. (T1, first temperature threshold). The temperature of the polymer waveguide is then rapidly increased to 120° C. (T3, third temperature threshold) and maintained for 7 minutes (t1), whereby compounds having desorption temperatures at or below 120° C. (T3) are desorbed from the polymer waveguide. In the test sample, the analyte of interest toluene has a desorption temperature below 120° C. and therefore desorbs from the polymer waveguide.

Figure 12:
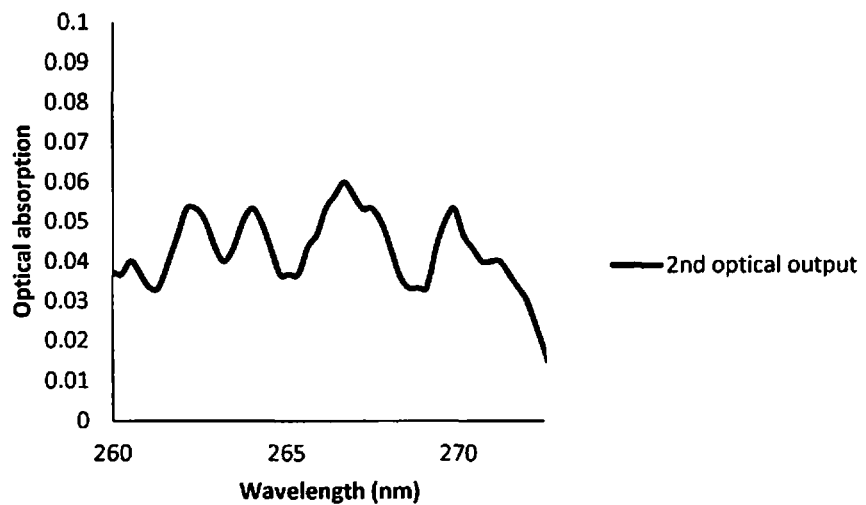
FIG. 12 is an absorption spectrum (second optical output) of a sample at the third temperature threshold (T3).

Subsequently, light is transmitted through the polymer waveguide to provide the second optical output, which is detected using a spectrometer as shown in FIG. 12. The second optical output is an optical absorption spectrum that is dependent on all analytes with desorption temperatures greater than 120° C. (T3, third temperature threshold). Absorption due to the toluene between 260 nm and 272.5 nm is obtained using the following equation and shown in FIG. 13.

$$A_{toluene} = 1^{st}\ \text{optical output} - 2^{nd}\ \text{optical output}$$

Figure 13:
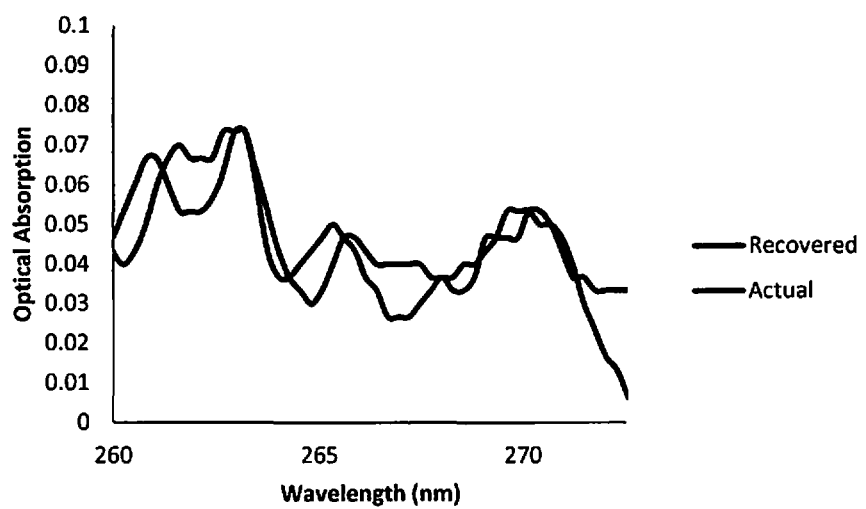
FIG. 13 shows a comparison of the "recovered" and "actual" absorption spectra of toluene.

In FIG. 13, the "recovered" line is generated by taking the difference between the first optical output and the second optical output for the complex mixture described above. The "actual" line is the optical absorption spectrum measured through the sensor at room temperature after exposing the sensor to toluene only at a concentration of 143 ppm. Toluene is identified by comparing the recovered absorption spectrum with the actual absorption spectrum. The normalized correlation between the recovered absorption spectrum of toluene using the heat stripping absorption spectroscopy method and the actual absorption spectrum of toluene is 0.98. There is only a 1% difference between the area under the curve (AUC) of the recovered absorption spectrum and the actual absorption spectrum.

Figure 14:
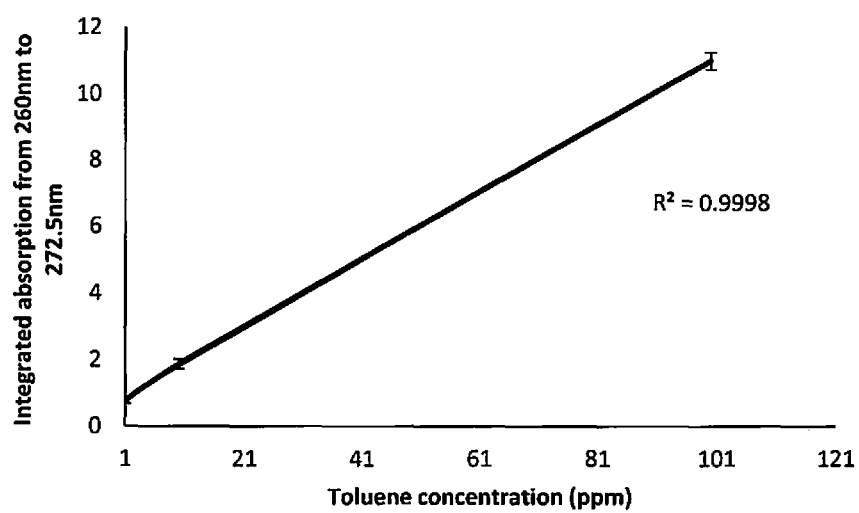
FIG. 14 shows integrated optical absorption from 260 nm to 272.5 nm for various concentrations of toluene (ppm).

A concentration calibration curve is generated for the analyte of interest by repeating the "actual" line measurement for a range of toluene concentrations. For each known concentration, the AUC of the "actual" line provides a single reference value that can be associated with the known concentration. All concentrations are plotted onto a single axis to form a concentration curve for the analyte of interest. FIG. 14 shows a concentration calibration curve for toluene. Since the "recovered" line and the "actual" line are closely correlated, the AUC from the "recovered" line of a sample under test can be compared to the calibration curve to quantify the analyte of interest.

The method is optionally continued, whereby the polymer waveguide is heated to a fourth temperature threshold of 140° C. (T4) and maintained for 7 minutes (t2), whereupon a third optical output is detected, and a further analyte of interest is identified and quantified in the same manner described.

All documents cited are incorporated herein by reference; the citation of any document is not to be construed as an admission that it is prior art with respect to the present invention.

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

The invention claimed is:

1. A method of isolating and quantifying one or more analytes of interest in a sample, the method comprising:
   a) providing a sample comprising:
      (1) the one or more analytes of interest; and
      (2) optionally, one or more additional compounds other than the one or more analytes of interest, wherein each of the one or more additional compounds has a polymer waveguide desorption temperature above a first temperature threshold and at or below a second temperature threshold,
   b) adjusting a temperature of a polymer waveguide to the first temperature threshold;
   c) contacting the polymer waveguide with the sample; whereby the one or more analytes of interest and the one or more additional compounds, if present in the sample, are captured and concentrated in the polymer waveguide;
   d) heating the polymer waveguide to the second temperature threshold and maintaining the second temperature threshold for a predetermined period of time, whereby the one or more additional compounds other than the one or more analytes of interest if present in the sample, are desorbed from the polymer waveguide;
   e) transmitting light through the polymer waveguide to provide a first optical output;
   f) detecting the first optical output with an optical detector;
   g) heating the polymer waveguide to a third temperature threshold and maintaining the third temperature threshold for a predetermined period of time, whereby a first analyte of interest of the one or more analytes of interest having a desorption temperature at or below the third temperature threshold and above the second temperature threshold is desorbed from the polymer waveguide;
   h) transmitting light through the polymer waveguide to provide a second optical output;
   i) detecting the second optical output with the optical detector;
   j) determining an absorption measurement of the first analyte of interest by analyzing a difference between the first optical output and the second optical output; and
   k) quantifying a concentration of the first analyte of interest based on the absorption measurement of the first analyte of interest.

2. The method of claim 1, wherein the optical detector is a spectrometer and the first and second optical outputs comprise absorption spectra.

3. The method of claim 1, wherein the optical detector is a photodetector and the first and second optical outputs comprise optical intensity.

4. The method of claim 1, further comprising:
   l) heating the polymer waveguide to a fourth temperature threshold and maintaining the fourth temperature threshold for a predetermined period of time, whereby a second analyte of interest of the one or more analytes of interest having a desorption temperature at or below the fourth temperature threshold and above the third temperature threshold is desorbed from the polymer waveguide;
   m) transmitting light through the polymer waveguide to provide a third optical output;
   n) detecting the third optical output with the optical detector;
   o) determining an absorption measurement of the second analyte of interest by analyzing a difference between the second optical output and the third optical output; and
   p) quantifying a concentration of the second analyte of interest based on the absorption measurement of the second analyte of interest.

5. The method of claim 4, wherein the optical detector is a spectrometer and the first, second, and third optical outputs comprise absorption spectra.

6. The method of claim 4, wherein the optical detector is a photodetector and the first, second, and third optical outputs comprise optical intensity.

7. The method of claim 1, wherein the steps of heating the polymer waveguide to a higher temperature threshold and maintaining the temperature, transmitting light through the polymer waveguide, detecting an optical output, and determining an absorption measurement are repeated such that a series of analytes of interest of the one or more analytes of interest in the sample are sequentially desorbed from the polymer waveguide, wherein each sequentially detected optical output is compared to the optical output detected at a previous temperature threshold to quantify the concentration of each analyte of interest in the series of analytes of interest in the sample.

8. The method of claim 1, wherein concentration of the first analyte of interest is determined by comparing an integrated optical absorption over a predetermined wavelength range of the first analyte of interest with an integrated optical absorption over said predetermined wavelength range of a known concentration of the first analyte of interest.

9. The method of claim 1, wherein the polymer waveguide comprises a polymer comprising a siloxane functional group as a repeatable unit.

* * * * *